US008651677B2

(12) United States Patent
Rowe

(10) Patent No.: US 8,651,677 B2

(45) Date of Patent: Feb. 18, 2014

(54) MOUNTING MECHANISM FOR A COMPONENT OF AN IMAGING APPARATUS, AND METHODS OF MAKING AND USING SAME

(75) Inventor: Jason Lee Rowe, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 175 days.

(21) Appl. No.: 12/824,708

(22) Filed: Jun. 28, 2010

(65) Prior Publication Data

US 2011/0315836 A1 Dec. 29, 2011

(51) Int. Cl.
*G02B 7/182* (2006.01)

(52) U.S. Cl.
USPC ........... 359/872; 359/822; 359/823; 359/820; 248/901

(58) Field of Classification Search
USPC .......... 248/201; 359/872, 822, 823, 849, 881, 359/820, 848; 399/221; 211/51
See application file for complete search history.

(56) References Cited

U.S. PATENT DOCUMENTS

| | | | | |
|---|---|---|---|---|
| 2,564,518 | A * | 8/1951 | Bedinger | 211/51 |
| 3,245,031 | A * | 4/1966 | Barney et al. | 439/861 |
| 4,966,439 | A * | 10/1990 | Althaus et al. | 359/820 |
| 5,150,260 | A * | 9/1992 | Chigira | 359/694 |
| 5,239,361 | A * | 8/1993 | Burch | 356/451 |
| 5,391,866 | A * | 2/1995 | Hoshino et al. | 250/201.2 |
| 5,815,325 | A * | 9/1998 | Johnson | 359/696 |
| 6,149,108 | A * | 11/2000 | Weickenmeier et al. | 248/74.1 |
| 6,554,244 | B1 * | 4/2003 | Graffenried et al. | 248/694 |
| 6,870,632 | B2 * | 3/2005 | Petasch et al. | 356/614 |
| 7,065,295 | B2 * | 6/2006 | Jeong et al. | 396/85 |
| 7,253,975 | B2 * | 8/2007 | Takabayashi | 359/819 |
| 7,352,520 | B2 * | 4/2008 | Makino et al. | 359/819 |
| 7,616,391 | B2 * | 11/2009 | Shinke et al. | 359/813 |
| 7,755,859 | B2 * | 7/2010 | Lee et al. | 359/823 |
| 7,876,509 | B2 * | 1/2011 | Avital et al. | 359/696 |
| 7,878,665 | B2 * | 2/2011 | Imoto | 353/100 |
| 2008/0273254 | A1 * | 11/2008 | Park | 359/811 |
| 2011/0096419 | A1 * | 4/2011 | Matsuo et al. | 359/820 |

* cited by examiner

*Primary Examiner* — Terrell McKinnon
*Assistant Examiner* — Daniel J Breslin

(57) ABSTRACT

A laser scan unit for an imaging apparatus, including an optical paths having a plurality of optical components for directing and focusing a light beam. A component mounting mechanism is employed having a first member which is substantially fixed and resistant to movement, and a second member having an end portion which flexibly moves in response to forces acting thereon that are generated by changes in temperature due to differences in thermal expansion between the component and the first and second members.

20 Claims, 3 Drawing Sheets

MOUNTING MECHANISM FOR A COMPONENT OF AN IMAGING APPARATUS, AND METHODS OF MAKING AND USING SAME

BACKGROUND

1. Field of the Invention

The present invention relates generally to an image forming apparatus and, more particularly, to a mounting mechanism for use with mounting components in an optical path of the image forming apparatus.

2. Description of the Related Art

Laser scanning devices may use housings, motors, mirrored polygons or reflective torsion oscillators, lenses, and/or mirrors in order to accomplish their function. Because of the level of accuracy needed, the proper mounting of these components is important. The lenses need to be mounted such that the pointing of the laser beam is properly positioned and the focus of the beam is within its operational limits. In addition to pointing and focusing the laser beam during normal operating conditions, the components need to be mounted so that they are able to withstand common usage conditions, including changes in temperature and humidity. Further, the components need to be able to withstand conditions like vibration and being accidentally dropped.

In the past, mounting of lenses and mirrors was accomplished by a mechanical hardware method that employed screws, clamps, and other types of hardware. While relatively effective, it is not cost efficient. To reduce cost, other methods of mounting the lenses arose, including the use of adhesives to bond the components in place relative to each other.

The use of adhesives is not without its shortcomings, however. Three possible failure modes can arise when adhesives are used to mount lenses and mirrors in the housing of a laser scanning unit. The first mode of failure is a catastrophic loss of the adhesion to the components to which the adhesive is bonded. Because the components are typically made from different materials, each component will expand and contract at a different rate. When this occurs, internal forces develop in the assembly because one component is trying to expand faster than another. So even though components may be of substantially equal length and the forces could be within the range of the adhesive to remain bonded when assembled, when the temperature changes the two different components will have different lengths. When this occurs, the forces that develop from the thermal expansion (and expansion due to humidity) are oftentimes greater than the adhesive's bond to the surface of the components to which it is bonded and the bond breaks, causing a failure. Cycling temperature changes exacerbate the problem by repeatedly generating forces until the material eventually breaks.

The second mode of failure, though less severe, is due to plastic deformation of either the laser scanning unit components or the adhesive itself. This second mode is due to the same root cause, thermal expansion. However, instead of the adhesive bond breaking, the materials plastically deform. What is generally desired is for any deformation to be elastic in nature so that when the forces subside, the components return to their original position. However, if the materials are sufficiently stressed, the components or the adhesive plastically deform, causing beam pointing and/or focus to be outside of operating specifications.

The third failure mode is the least severe but nevertheless causes print defects and is very difficult to compensate for in firmware. Here, there is elastic deformation of the lenses or mirrors due to expansion/contraction. The deformation causes the lenses or mirrors to shift their pointing and/or focus resulting in a print defect.

Based upon the foregoing, there is a need for an improved mounting mechanism for components of the laser scanning unit of an imaging system.

SUMMARY OF THE INVENTION

Embodiments of the present invention overcome shortcomings seen in prior laser scanning devices and thereby satisfy a significant need for a mounting mechanism which substantially maintains optical components in a desired position and orientation. In accordance with an exemplary embodiment of the present invention, there is shown an optical assembly for an imaging apparatus, including a base; a component for receiving light from a light source; a first mounting member extending from the base and having an outer end portion that is substantially resistant to movement relative to the base in response to a change in temperature; and a second mounting member extending from the base and having an outer end portion. The component is attached to the outer end portion of the first and second mounting members and the outer end portion of the second mounting member flexibly moving relative to the base in response to a change in temperature so that the component remains attached to the base via the first and second mounting members.

Further, the outer end portion of the second mounting member is movable relative to the base in only a first direction in response to a change in temperature, and rotatable only about a first axis of rotation. With the first direction and first axis of rotation substantially aligned with a direction of thermal expansion and contraction of the component and mounting members, the second mounting member flexes in response to forces generated by differences in thermal expansion and contraction and thereby prevents material deformation and broken adhesive bonds.

Additional features and advantages of the invention will be set forth in the detailed description which follows and in part will be readily apparent to those skilled in the art from that description or recognized by practicing the invention as described herein, including the detailed description, which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION

Figure 1:
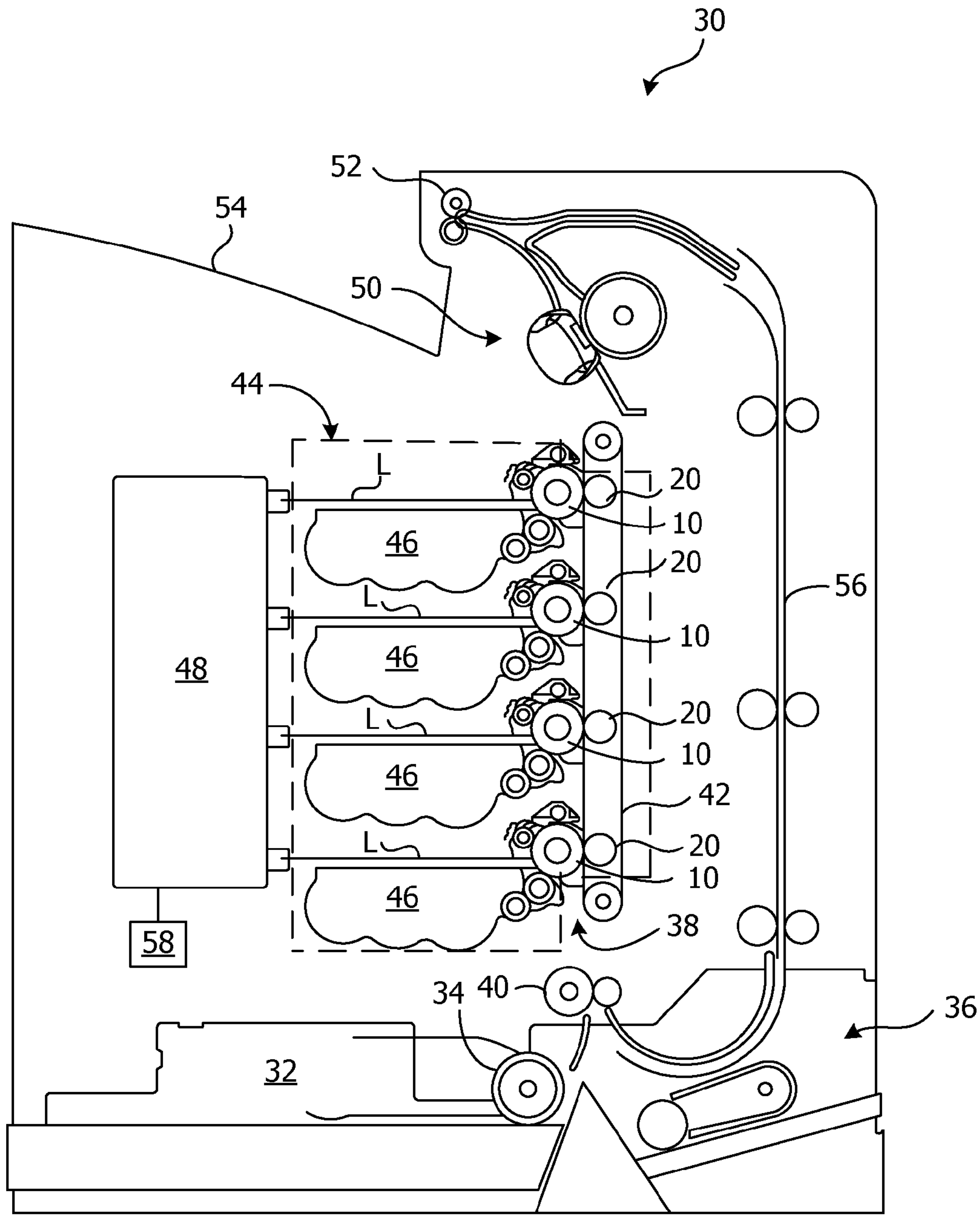
FIG. 1 is side view of an electrophotographic imaging system utilizing features of exemplary embodiments of the present invention.

It is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof are used broadly and encompass direct and indirect connections, couplings and mountings. In addition, the terms "connected" and "coupled" and variations thereof are not restricted to physical or mechanical connections or couplings.

Reference will now be made in detail to the exemplary embodiment(s) of the invention, as illustrated in the accompanying drawings. Whenever possible, the same reference numerals will be used throughout the drawings to refer to the same or like parts.

FIG. 1 illustrates an image forming apparatus 30 using features of exemplary embodiments of the present invention. The image forming apparatus 30 includes a media tray 32 with a pick mechanism 34 and manual input 36 for introducing media in the image forming apparatus 30. Media from the media tray 32 or the manual input 36 are fed into a primary media path 38. One or more registration rollers 40 are disposed along the primary media path 38 to align media and precisely control its further movement along the primary media path 38. A media transport belt 42 may form a section of the primary media path 38 for moving media past an image transfer assembly 44. The image transfer assembly 44 includes a plurality of imaging units 46.

Image forming apparatus 30 may include four imaging units 46 for printing with cyan, magenta, yellow, and black toner to produce a color image. Each imaging unit 46 may include a charge member, a developer roll, and a photoconductive drum 10. The charge member charges the surface of the photoconductive drum 10 to a specified voltage. A laser beam L generated by a laser scan unit 48 contacts the surface of each photoconductive drum 10 and discharges those areas it contacts to form a latent image. The developer roll serves to develop toner into the latent image on the photoconductive drum 10. The toner particles are attracted to areas of the surface of photoconductive drum 10 discharged by the laser beam from laser scan unit 48. Each of the four photoconductive drums 10 is positioned opposite a corresponding transfer roller 20 such that four transfer nips are formed therewith.

Following transfer of a toner image onto a sheet of media by imaging units 46, the media sheet passes through fuser unit 50 wherein the transferred toner is fused to the sheet due to application of heat and pressure. Thereafter, the media sheet passes through exit rollers 52 and is placed in output area 54 or enters duplex path 56 for printing on the opposite side of the media sheet as part of a duplex printing operation. A controller 58 may be coupled to laser scan unit 48, imaging units 46 and other components of image forming apparatus 30 for controlling the operation thereof.

Though image forming apparatus 30 is illustrated in FIG. 1 as a color printing apparatus, it is understood that image forming apparatus 30 may be a monochrome printing apparatus. In addition, it is understood that image forming apparatus 30 may transfer a toner image in a two step transfer operation, as is known in the art.

Figure 2:
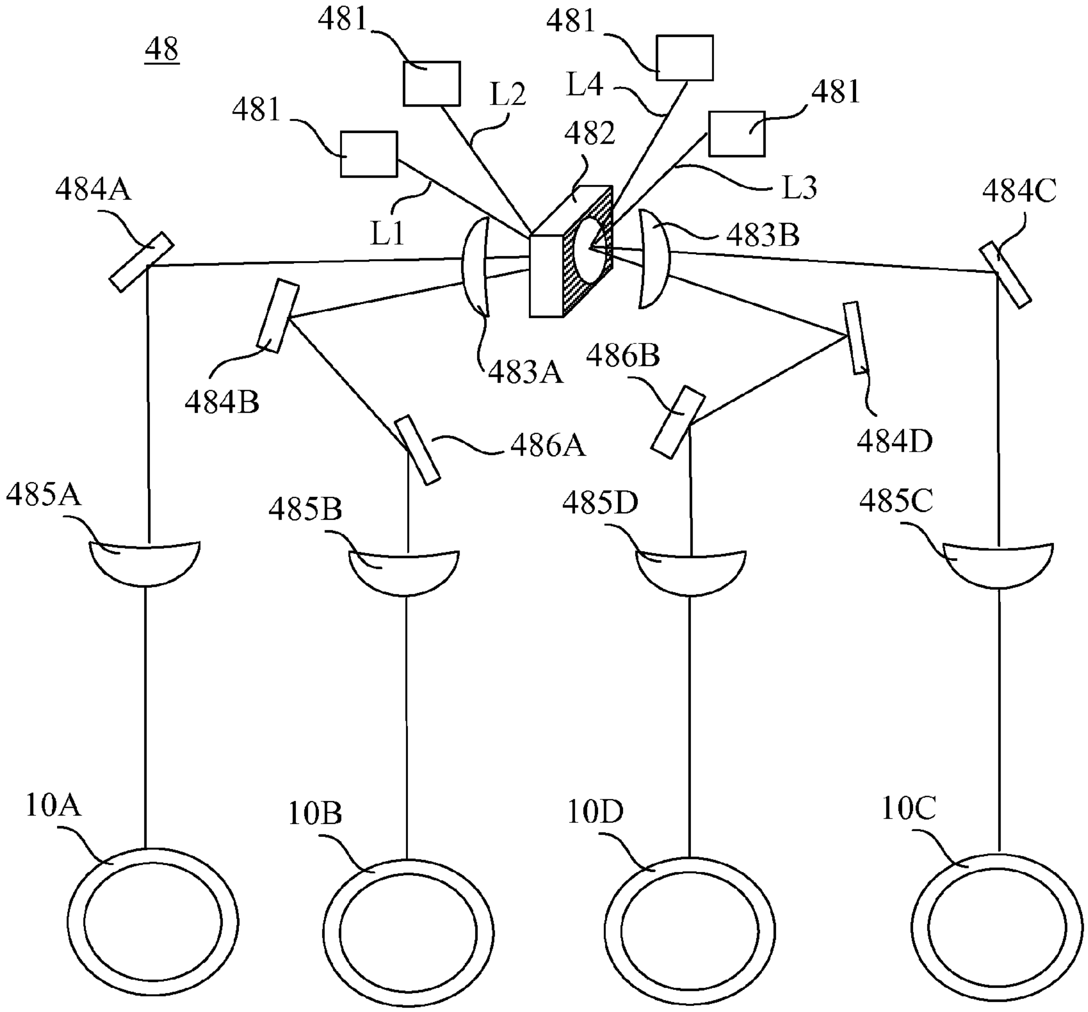
FIG. 2 is a diagram illustrating the optical path of a laser scan unit of FIG. 1 according to an exemplary embodiment of the present invention.

Laser scan unit 48 may include four optical paths for directing laser beams L onto photoconductive drums 10. FIG. 2 schematically illustrates the optical paths of laser scan unit 48 in accordance with an exemplary embodiment of the present invention. In accordance with the exemplary embodiment, laser scan unit 48 is shown in which laser beams L1-L4, one for each imaging unit 46, is generated by laser diodes 481. Laser scan unit 48 may include a torsion oscillator 482 which oscillates about a central axis and includes two light reflective surfaces. Torsion oscillator 482 may be constructed from a semiconductor chip. Details concerning torsion oscillators may be found in U.S. Pat. No. 7,321,379 which issued to assignees of the present application on Jan. 22, 2008, the content of which is hereby incorporated by reference herein in its entirety. Alternatively, laser scan unit 48 may utilize a rotating, polygonal mirror which reflects laser beams L towards photoconductive drums 10, as is known in the art.

The laser beams L1 and L2 are reflected from a first reflective side of oscillator 482. After reflecting from the oscillator 482, beams L1 and L2 may pass through first scanning lens 483A, with beam L1 then reflected by mirror 484A and beam L2 reflected by mirror 484B. Following reflection from mirror 484A, beam L1 may pass through second scanning lens 485A and be directed onto photoconductive drum 10A. Beam L2 may be reflected by mirror 486A and pass through second scanning lens 485B before being directed onto photoconductive drum 10B. Similarly, after reflecting from a second reflective surface of oscillator 482, beams L3 and L4 may pass through first scanning lens 483B, with beam L3 then reflected by mirror 484C and beam L4 reflected by mirror 484D. Following reflection from mirror 484C, beam L3 may pass through second scanning lens 485C and be directed onto photoconductive drum 10C. Beam L4 may be reflected by mirror 486B and pass through second scanning lens 485D before being directed onto photoconductive drum 10D.

It is understood that the optical paths depicted in FIG. 2 is illustrative of one of many possible optical paths that may be used in laser scan unit 48, and that the optical paths of laser scan unit 48 may include more, less or a different arrangement of mirrors and lenses for directing and focusing laser beams L1-L4 onto photoconductive drums 10.

As discussed above, the optical paths of prior laser scan units often experience various failures when environmental conditions change. A cause of the failures is that the housings in which the lenses and mirrors are mounted are typically very rigid and designed not to flex so that when thermal expansion occurs, either the adhesive bonds used in mounting the optical components break, the components warp, or the component mountings warp in an unpredictable manner. This results in the focus and alignment of the laser beams being adversely affected in an unpredictable way. Each optical component of the optical path is usually supported in two or more places with adhesive. The amount of force that is developed or the warp that occurs has been seen to be proportional to the size of the components.

Exemplary embodiments of the present invention remedy the problems created when using adhesives for mounting optical components by relieving the internal stresses that develop within scan unit 48. In accordance with the exemplary embodiments, the mounting mechanism for the optical components allow movement in the direction of the thermal expansion and contraction and thereby relieves stress while limiting movement in any other direction in order to prevent the laser beam pointing direction or the beam focus from changing. Any such movement of the optical component can be accounted for electronically by monitoring the temperature of the system and adjusting for the change via firmware executed by controller 58.

Figure 3:
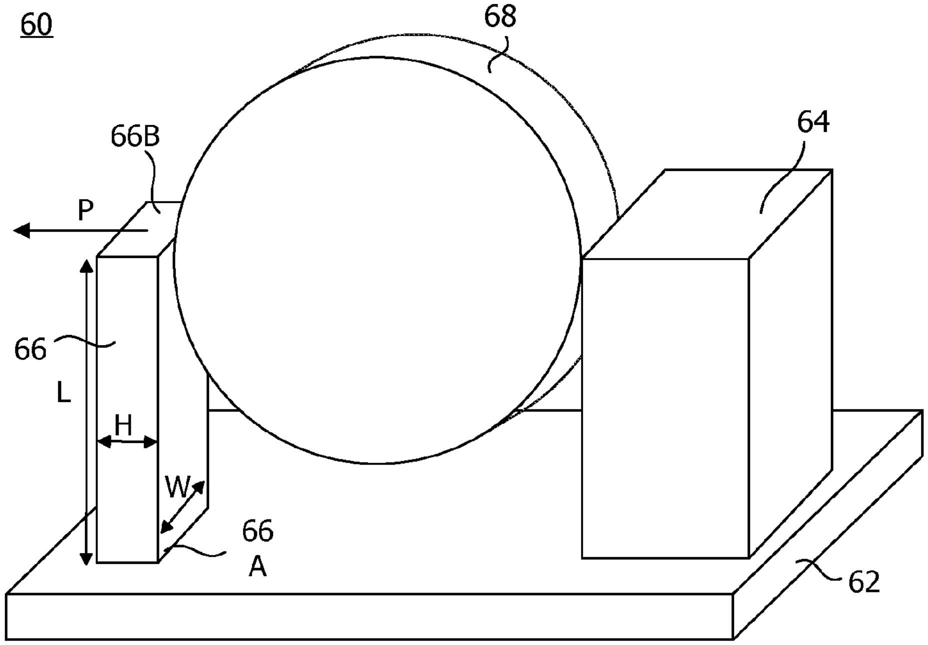
FIG. 3 is a perspective view of an optical component of the optical path of FIG. 2.
Figure 4:
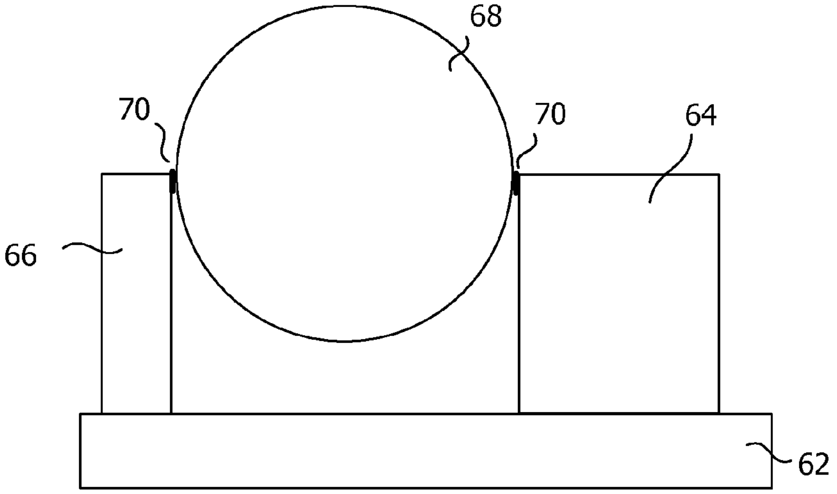
FIG. 4 is an elevational view of the optical component of FIG. 3.

In an exemplary mounting mechanism, only one component mounting point is utilized that is substantially rigid in all directions and all axes of rotation. In addition, one or more secondary mounting points may be utilized that are rigid in all but one direction and one axis of rotation. Such secondary mounting points may take the form of cantilever beams such that in the direction of thermal expansion, the cantilever beams are able to flex relatively easily yet in the other directions remain very rigid. FIGS. 3 and 4 illustrate a mounting mechanism 60 for an optical component of the optical paths of laser scan unit 48 according to an exemplary embodiment.

Mounting mechanism 60 may include a base portion 62 of the housing of laser scan unit 48. Base portion 62 may be constructed from a sturdy and rigid material, such as a plastic composition. A first mounting member 64 extends from base portion 62 and may include a first end portion attached to or otherwise formed with base portion 62, and a second end portion that is opposed the first end portion and is the outermost end of first mounting member 64, relative to base portion 62. First mounting member 64 may be formed from the same composition as the composition of base portion 62. First mounting member 64 is dimensioned such that first mounting member 64 is substantially rigid to stresses acting thereon, along substantially all axes of translation and rotation, due to changes in temperature and other environmental conditions such that first mounting member 64 is substantially fixed in position relative to base portion 62. The height of first mounting member 64, measured outwardly from base portion 62, may be sized so that the second end portion of first mounting member 64 attaches to and partly supports an optical component 68.

Mounting mechanism 60 may further include a second mounting member 66 having a first end portion 66A attached to or otherwise formed with base portion 62. Second mounting member 66 extends between first end portion 66A and opposed second end portion 66B and may take the shape of and otherwise function as a cantilevered beam. Second mounting member 66 may be formed from the same composition as the composition of base portion 62 or a different composition. Second mounting member 66 may be sized so that second end portion 66B attaches to and, along with first mounting member 64, supports optical component 68 of laser scan unit 48. Second mounting member 66 may be dimensioned so as to be able to flex in a direction of thermal expansion and contraction of optical component 68 as well as first and second mounting members 64 and 66, and be substantially fixed and rigid relative to base portion 62 in all other directions.

The movement of second end portion 66B of second mounting member 66 can be expressed by the equation, $$I=W*H^3/12,$$

where "I" is the moment of inertia of second mounting member 66, "W" is the width and "H" represents the height thereof. The maximum displacement Ymax of second end portion 66B may be expressed by $$Y_{max}=-P*L^3/3*E*I$$

where "L" is the length, "E" is the modulus and "P" is the force of second mounting member 66.

Optical component 68 may be attached to mounting mechanism 60 using an adhesive material. In particular, optical component 68 may attach to each of first mounting member 64 and second mounting member 66 using adhesive 70, as shown in FIG. 4. The adhesive material may be constructed from a composition known and used in the art for positioning optical components. It is understood that optical component 68 may be any component forming part of an optical path in laser scan unit 48, such as a mirror or lens.

According to the exemplary embodiments, the physical dimensions of second mounting member 66 are such that the force that is generated by thermal expansion or contraction of optical component 68, relative to first mounting member 64 and/or second mounting member 66, resiliently flexes the second mounting member 66 such that the force does not meet or exceed the stress limit for plastic deformation of the first and second mounting members 64 and 66 as well as optical member 68, or exceed the strength of the bond of adhesive 70. With second mounting member 66 flexing in response to forces due to thermal expansion or contraction, mounting mechanism 50 substantially reduces the types of failures described above with respect to traditional, adhesive-based component mounting techniques.

It is understood that the larger the size of optical components 68 and first and second mounting members 64 and 66, the greater the difference in the thermal expansion rates and thus the greater the force that will be created in response to changes in temperature, thereby resulting in a greater need to flexibly move second mounting member 66. Conversely, second mounting member 66 can be made taller in the direction perpendicular to the direction of thermal expansion to increase its moment of inertia and therefore have substantially negligible movement.

It is further understood that mounting mechanism 60 may include more than one second mounting member 66 for supporting optical component 68. In an exemplary embodiment, optical component 68 may be mounted to base portion 62 via first mounting member 64, as described above, and at least two second mounting members 66. In this embodiment, each second mounting member 66 may be substantially rigid and fixed in all but a single direction and axis of rotation. Use of more than one second mounting member 66 may be based upon the size and shape of the optical component 68 to be mounted, and/or upon the different direction of forces that are generated due to differences in thermal expansion/contraction.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. An imaging apparatus, comprising:

a base portion;

a light source disposed along the base portion; and an optical path for directing light generated by the light source, the optical path comprising:

at least one optical component; and at least one first mounting member and at least one second mounting member extending from the base portion, the at least one first mounting member being substantially rigidly attached to the base portion such that a distal end of the at least one first mounting member is substantially fixed in position relative to the base portion over changes in at least one environmental condition during usage of the imaging apparatus, the at least one environmental condition including at least one of temperature and humidity, and the at least one second mounting member being flexibly movable in at least one direction in response to the changes in the at least one environmental condition;

wherein the at least one optical component is attached to the at least one first mounting member and the at least one second mounting member with an adhesive;

wherein the at least one second mounting member comprises a beam having a first end portion attached to the base portion and a second end portion unconnected thereto, and the second end portion of the at least one second mounting member is flexibly movable along at least one axis of rotation about the first end portion in response to the changes in the at least one environmental condition.

2. The imaging apparatus of claim 1, wherein the at least one second mounting member is a cantilever beam having a first end portion attached to the base portion and a second end portion attached to the at least one optical component with the adhesive.

3. The imaging apparatus of claim 1, wherein the at least one second mounting member is dimensioned and constructed from a material to suitably flex in the at least one direction due to the changes in the at least one environmental condition without plastic deformation of the at least one second mounting member and the at least one optical component occurring and without breaking the adhesive attachment to the at least one optical component.

4. The imaging apparatus of claim 1, wherein the at least one second mounting member is dimensioned and constructed from a material such that one or more forces generated due to the changes in the at least one environmental condition is less than a stress limit of the adhesive.

5. The imaging apparatus of claim 1, wherein the at least one optical component comprises a lens.

6. The imaging apparatus of claim 1, wherein the at least one optical component comprises a mirror.

7. The imaging apparatus of claim 1, wherein the at least one optical component comprises a plurality of optical components, each optical component being attached to a distinct first mounting member and second mounting member.

8. The imaging apparatus of claim 1, wherein the at least one direction is one direction of thermal expansion and contraction.

9. The imaging apparatus of claim 1, wherein the at least one second mounting member is dimensioned to be flexibly movable only in one direction of thermal expansion and contraction and substantially fixed relative to the base portion in all other directions over the changes in the at least one environmental condition.

10. The imaging apparatus of claim 1, wherein the at least one optical component is directly attached to the at least one first mounting member and the at least one second mounting member via the adhesive.

11. An apparatus, comprising:

a base portion;

at least one component; and at least one first mounting member and at least one second mounting member extending from the base portion, the at least one first mounting member being substantially rigidly attached to the base portion such that a distal end of the at least one first mounting member is substantially fixed in position relative to the base portion over changes in at least one environmental condition during usage of the imaging apparatus, the at least one environmental condition including at least one of temperature and humidity, and the at least one second mounting member being flexible in at least one direction in response to the changes in the at least one environmental condition;

wherein the at least one component is adhesively attached to the at least one first mounting member and the at least one second mounting member;

wherein the at least one second mounting member is a cantilever beam having a first end portion attached to the base portion and a second end portion adhesively attached to the at least one component.

12. The apparatus of claim 11, wherein the second end portion of the at least one second mounting member is unconnected to the base portion, and is flexible along at least one axis of rotation about the first end portion in response to the changes in the at least one environmental condition.

13. The apparatus of claim 11, wherein the at least one second mounting member is dimensioned and constructed from a material to suitably flex in the at least one direction in response to the changes in the at least one environmental condition without plastic deformation of the at least one second mounting member and the at least one optical component occurring and without breaking the adhesive attachment to the at least one optical component.

14. The apparatus of claim 11, wherein the at least one second mounting member is dimensioned and constructed from a material such that a force generated by the changes in the at least one environmental condition is less than a stress limit of the adhesive attachment to the at least one component.

15. The apparatus of claim 11, wherein the at least one component comprises a lens.

16. The apparatus of claim 11, wherein the at least one component comprises a mirror.

17. The apparatus of claim 11, wherein the at least one direction is one direction of thermal expansion and contraction.

18. The apparatus of claim 11, wherein the at least one second mounting member is dimensioned to be flexibly movable only in one direction of thermal expansion and contraction and substantially fixed relative to the base portion in other directions over the changes in the at least one environmental condition.

19. The apparatus of claim 11, wherein the at least one component is directly attached to the at least one first mounting member and the at least one second mounting member via the adhesive attachment.

20. An apparatus, comprising:

a base portion;

a component; and a first mounting member and a second mounting member extending from the base portion, the first mounting member being substantially rigidly attached to the base portion such that a distal end of the first mounting member is substantially fixed in position relative to the base portion over changes in temperature or humidity during usage of the apparatus, and the second member being flexible in at least one direction in response to the changes in the temperature or the humidity such that the second mounting member sufficiently flexes in response to expansion and contraction forces acting on the apparatus while the distal end of the first mounting member remains substantially fixed, to prevent deformation of and detachments between the component and the first and second mounting members;

wherein the component is adhesively attached to the first mounting member and the second mounting member; and wherein the second mounting member is a cantilever beam having a first end portion attached to the base portion and a second end portion adhesively attached to the component.

* * * * *